March 11, 1952 — W. SUMMERBELL — 2,588,429
RECOIL-CONTROLLED AMMUNITION FEEDING MEANS FOR GUNS
Filed Sept. 4, 1947 — 10 Sheets-Sheet 1
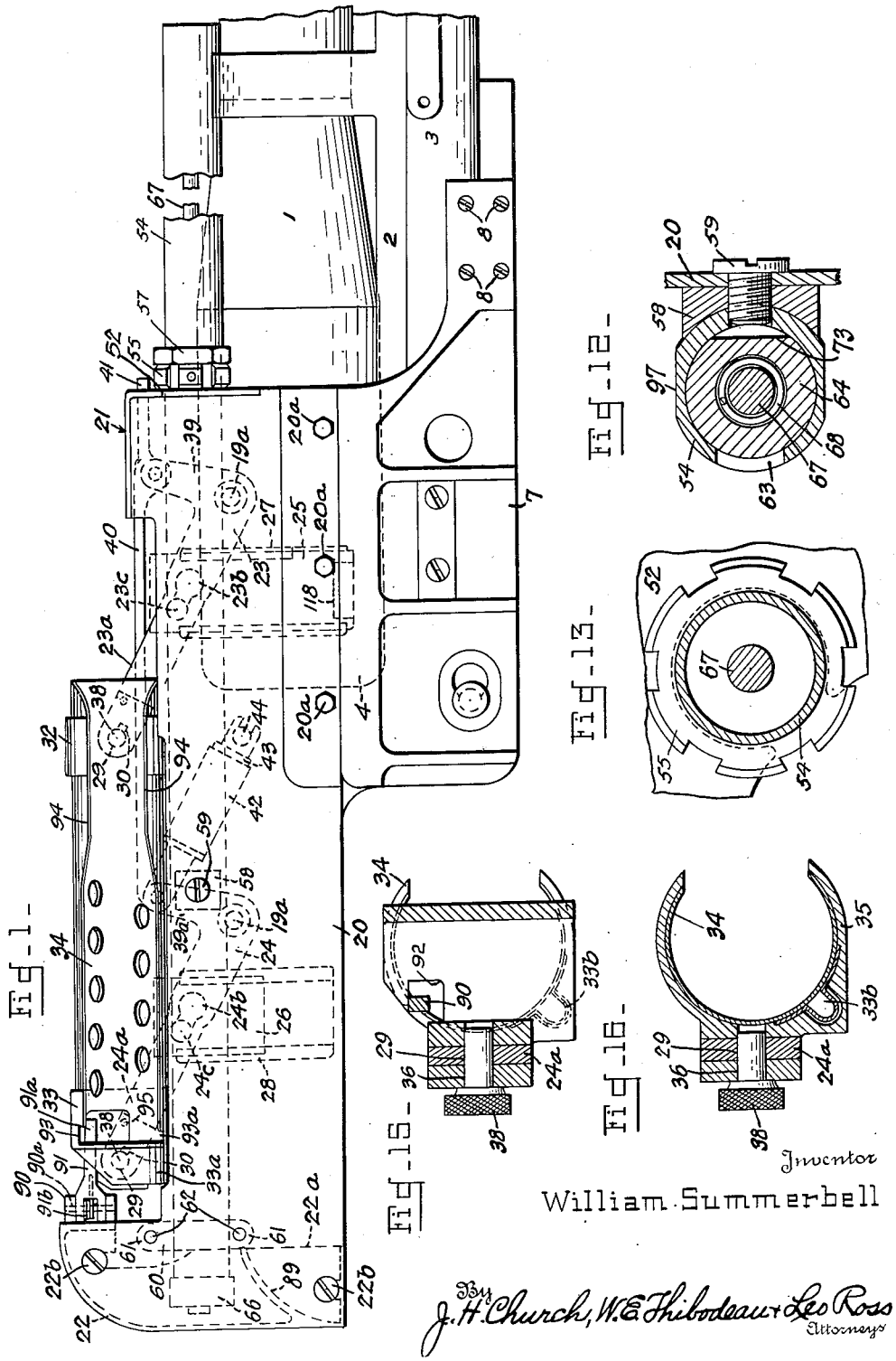
Inventor
William Summerbell
By J. H. Church, W. E. Thibodeau + Leo Ross
Attorneys

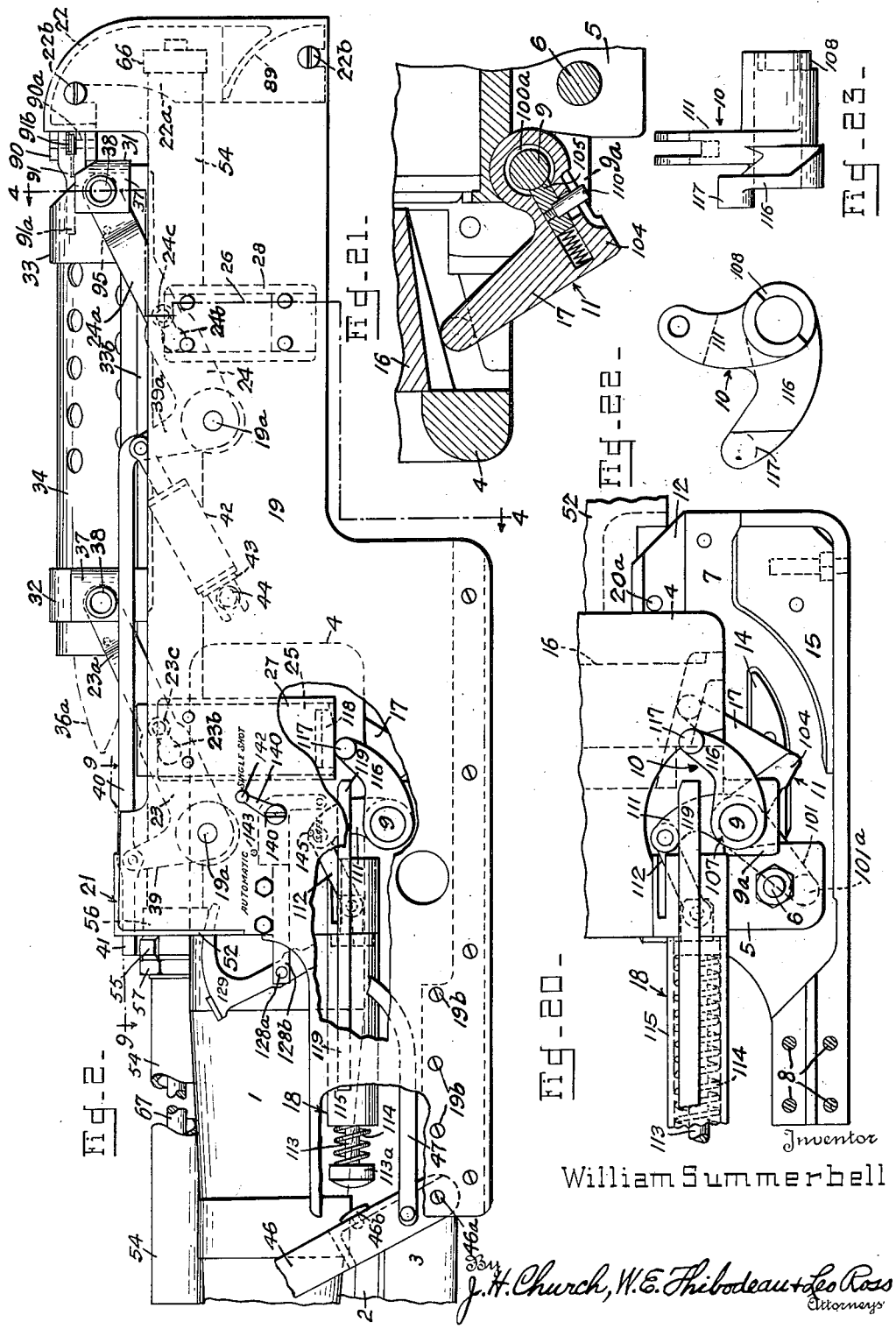

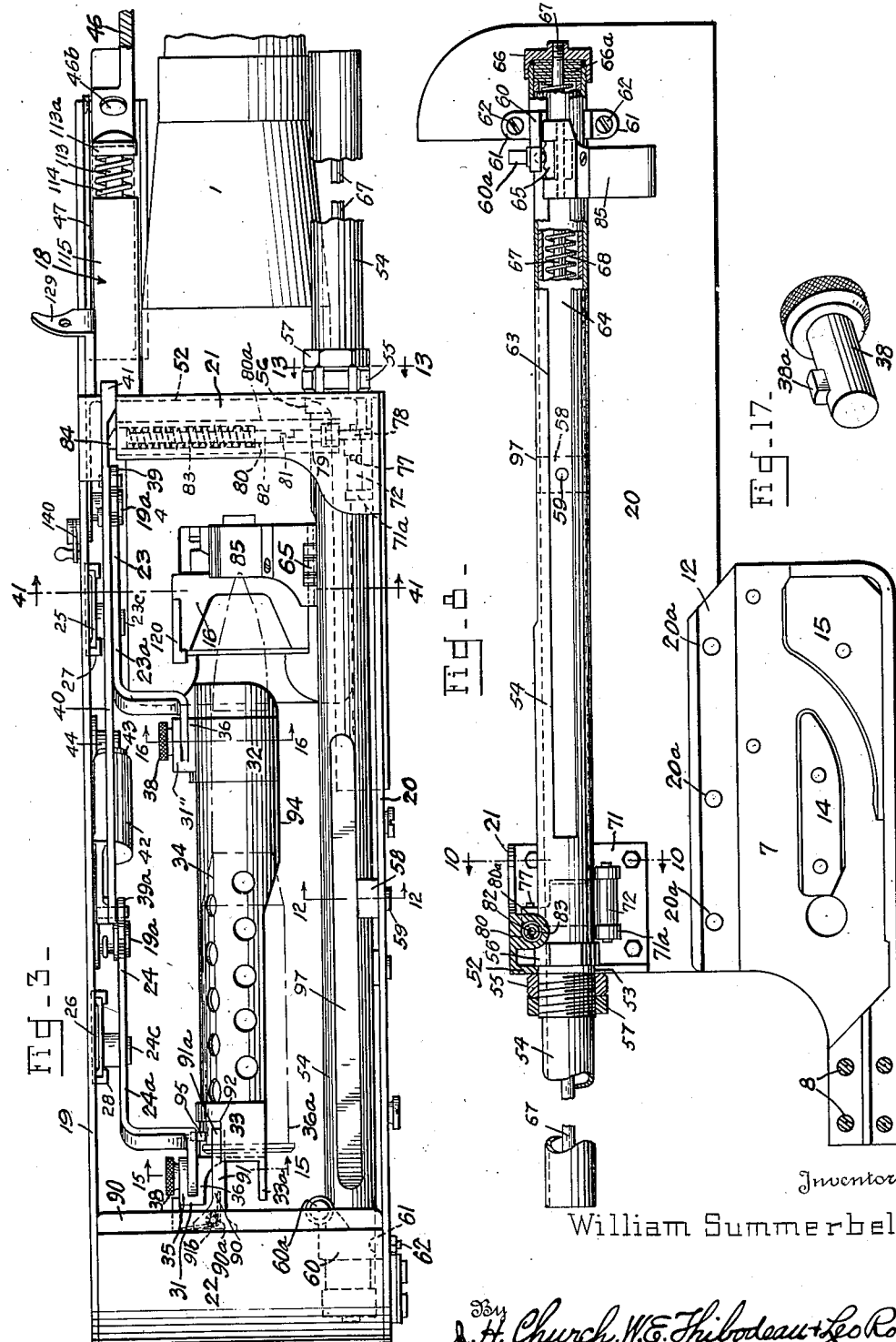

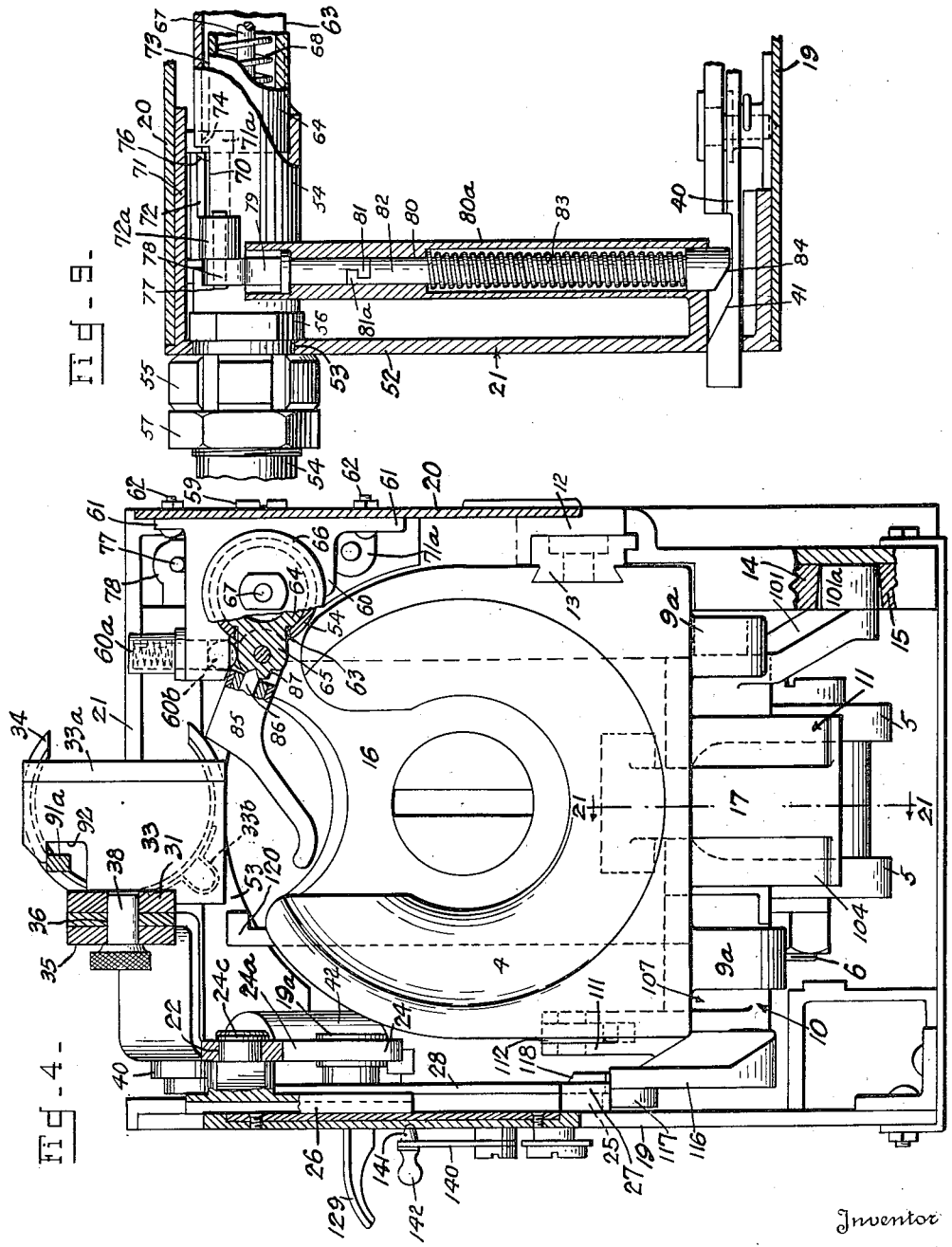

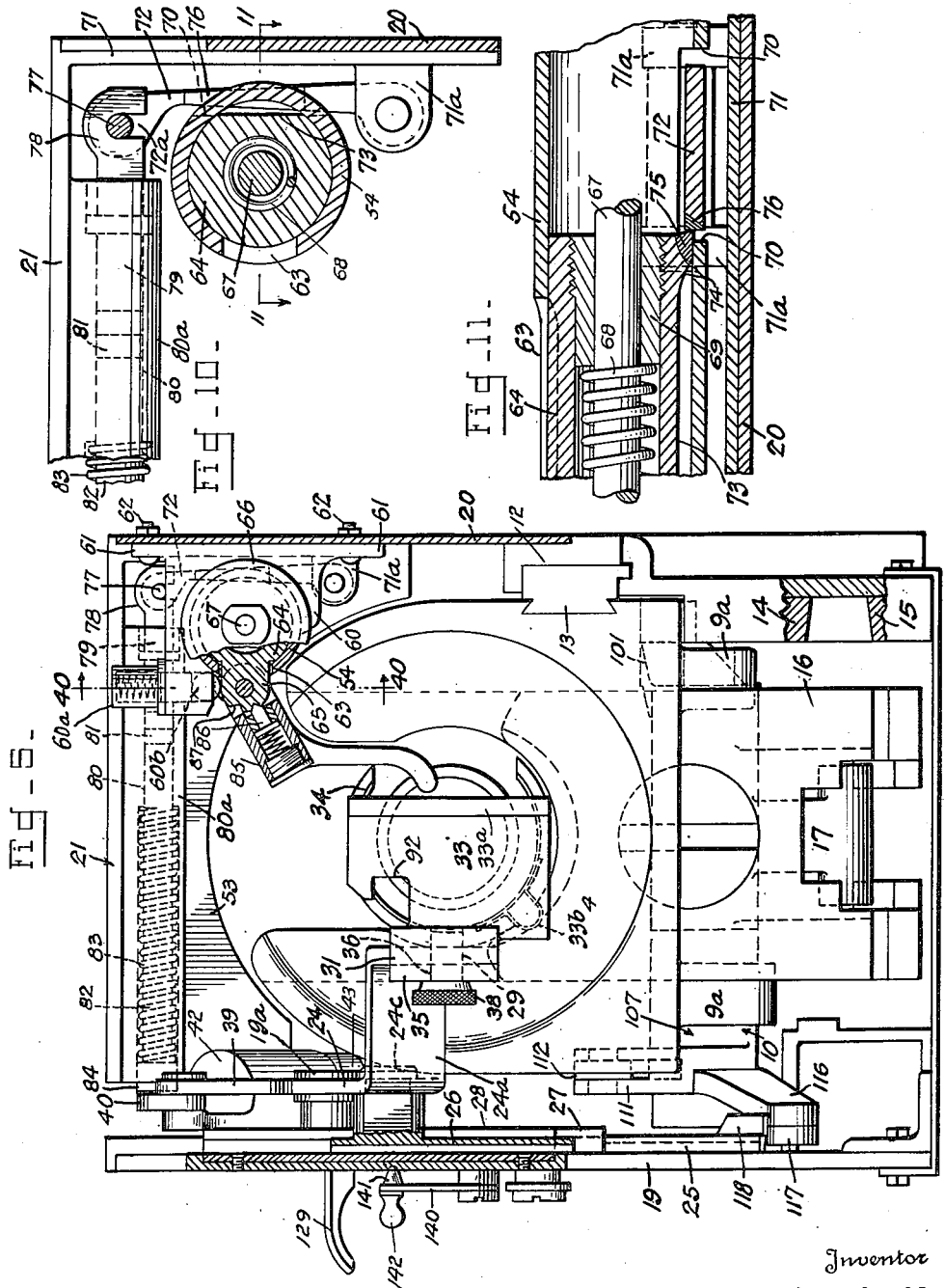

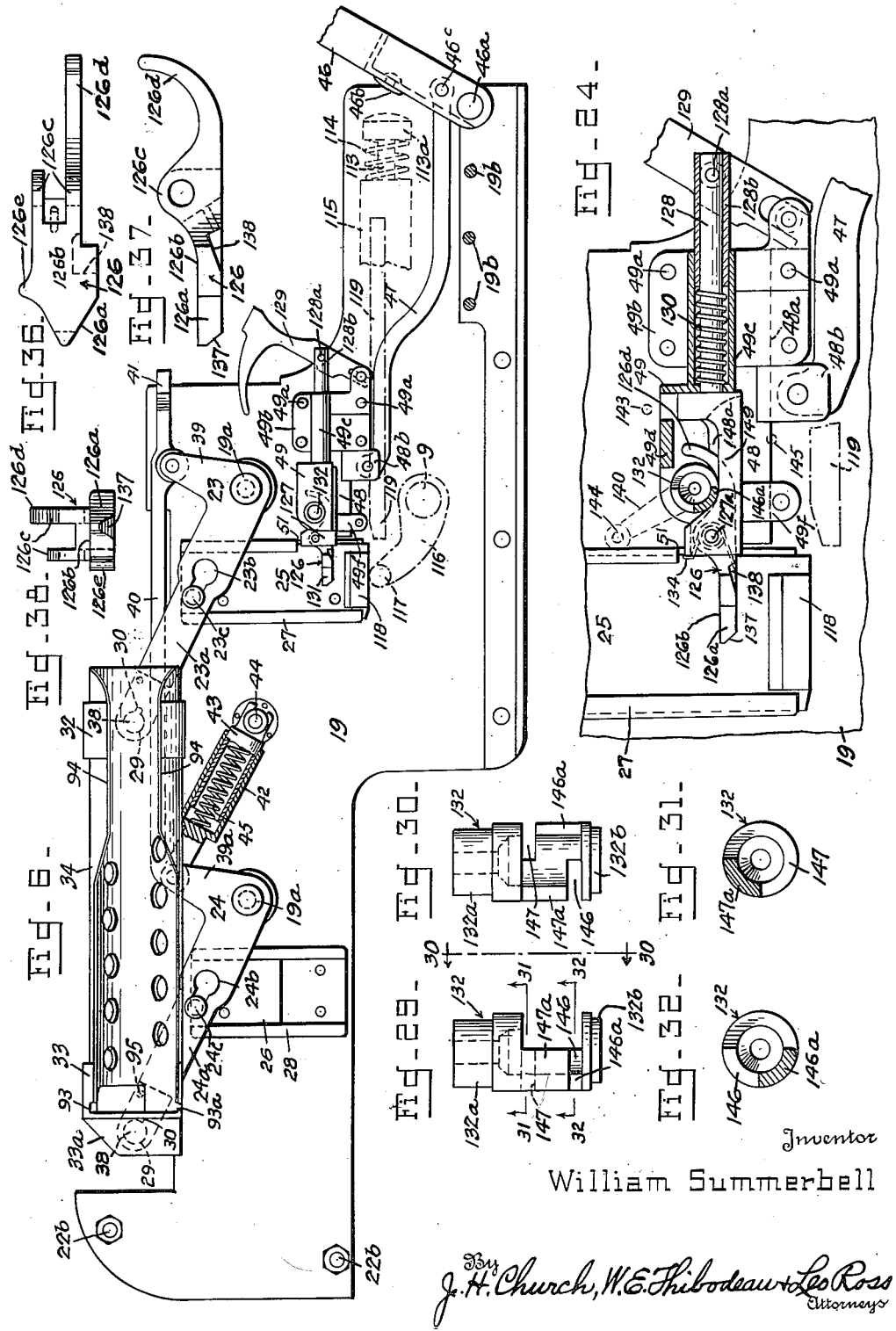

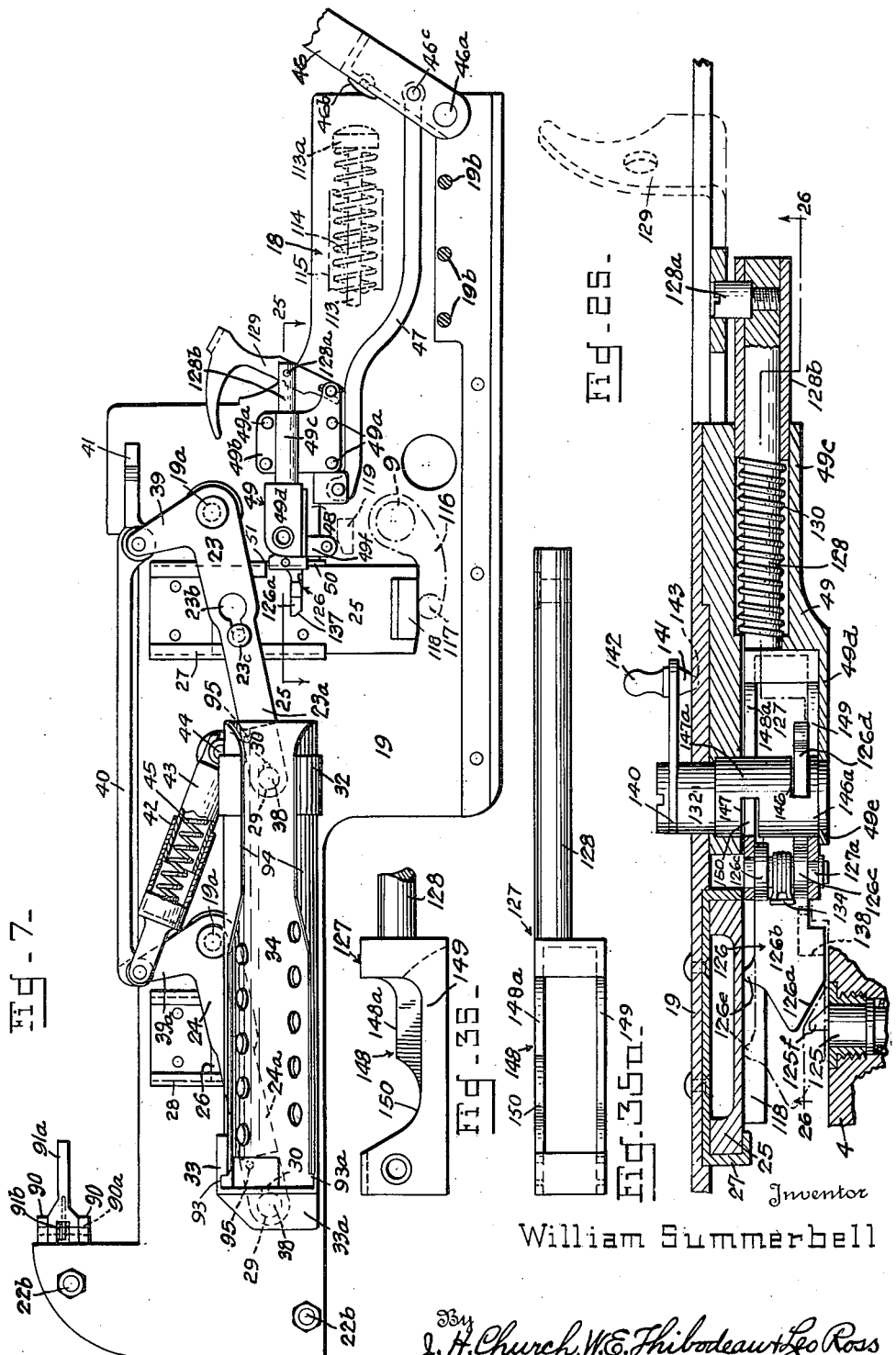

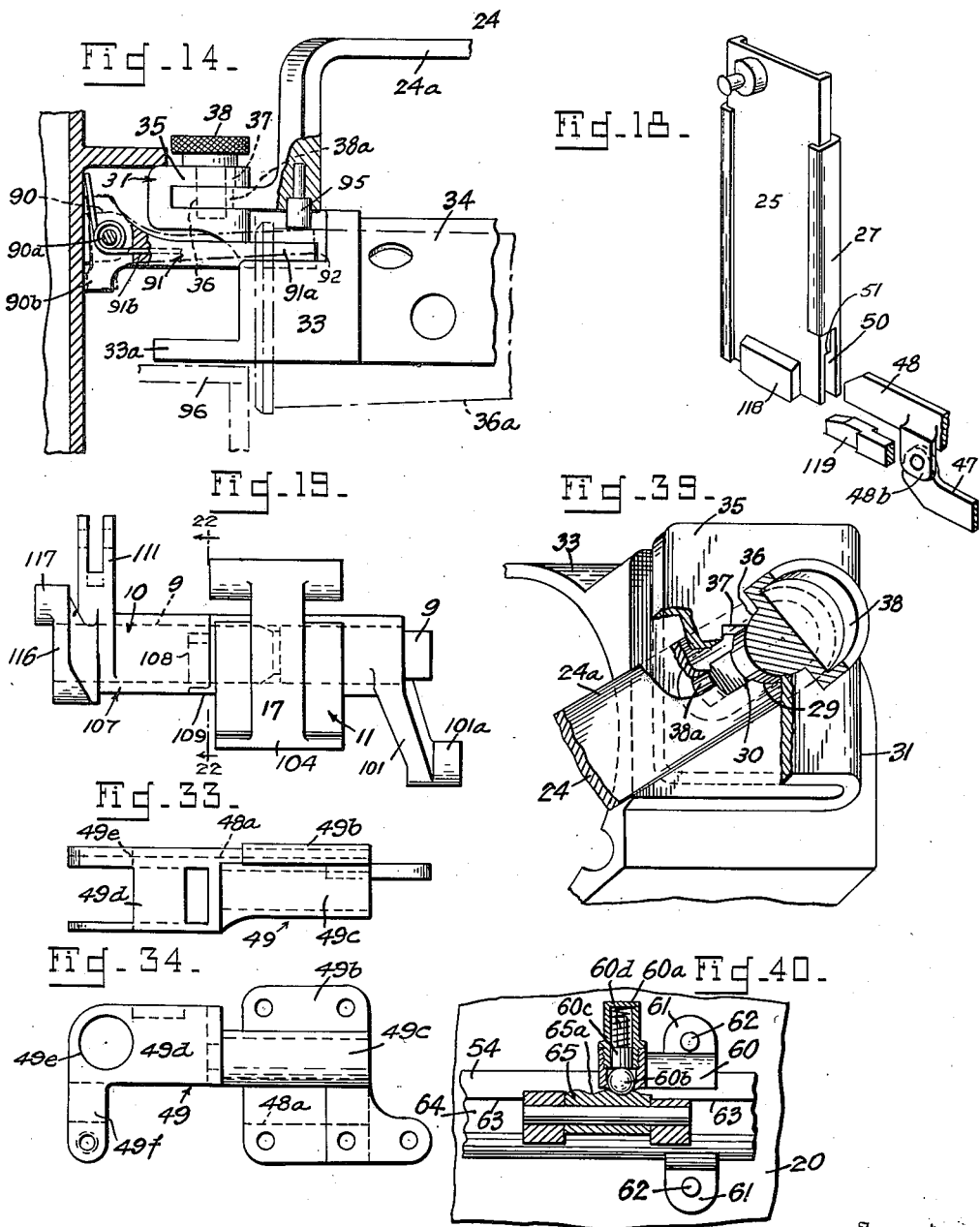

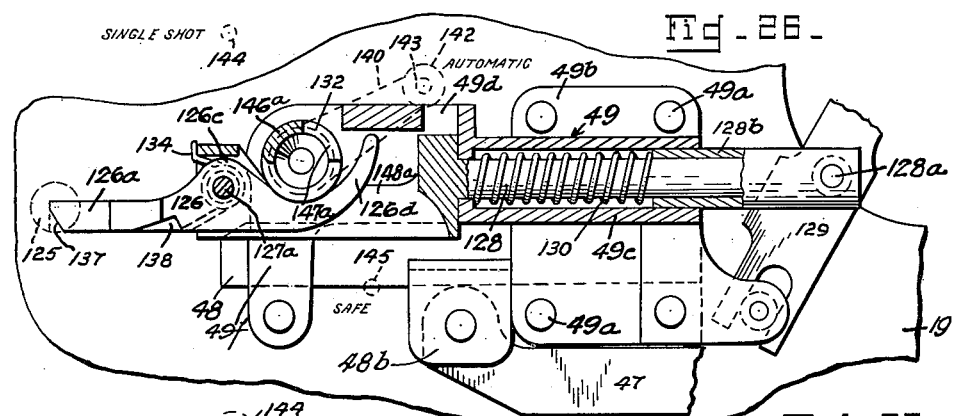
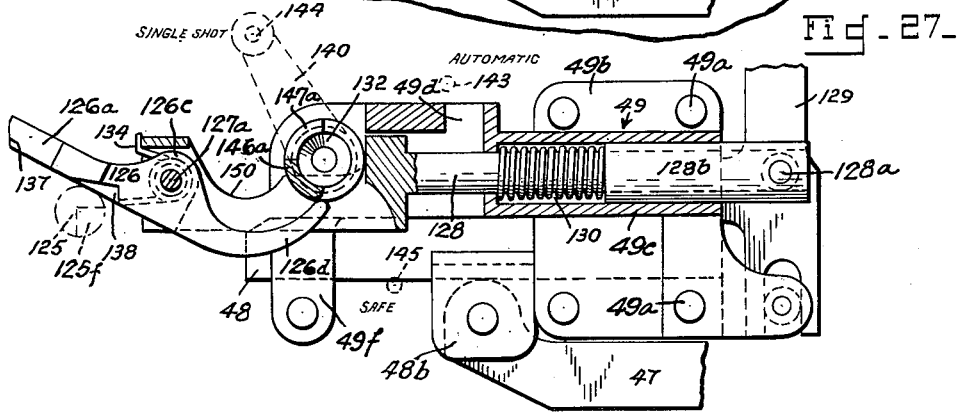
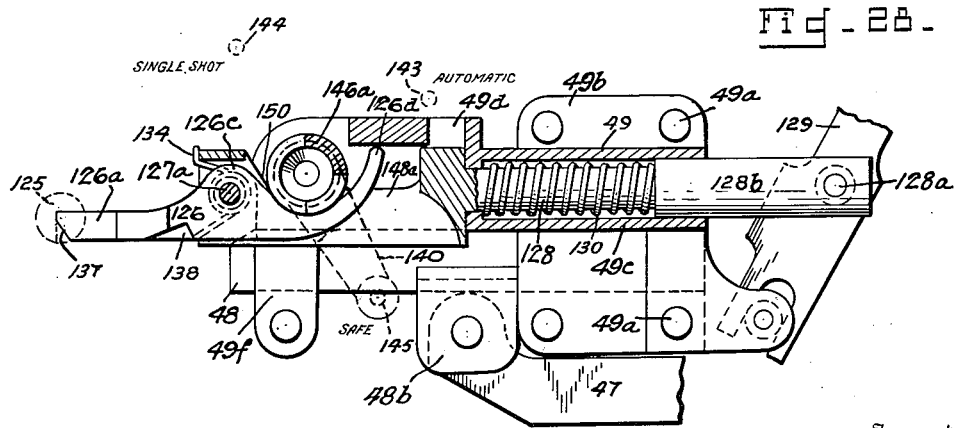

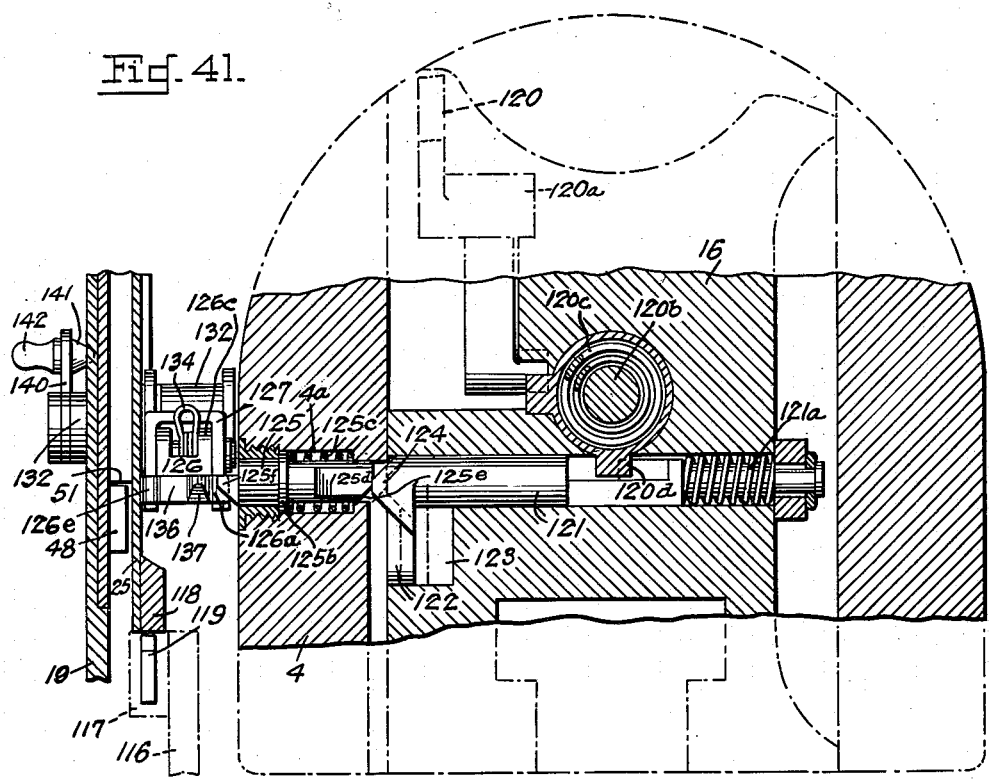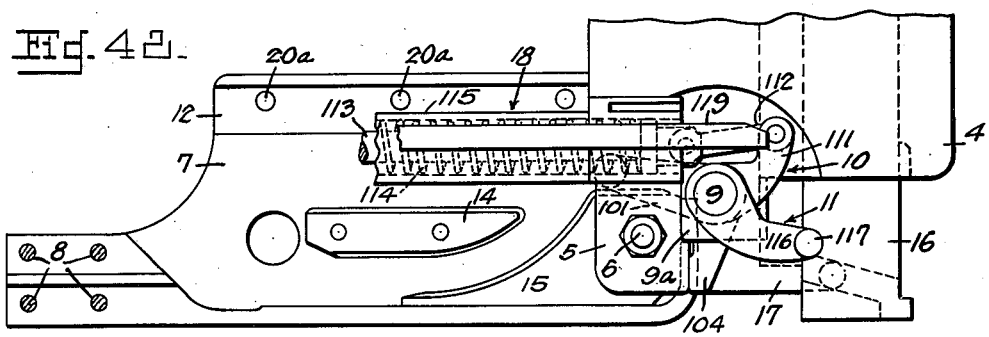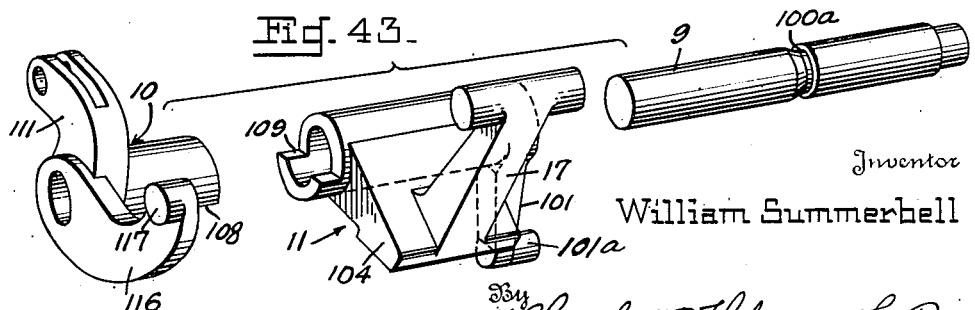

Patented Mar. 11, 1952

2,588,429

UNITED STATES PATENT OFFICE 2,588,429

RECOIL-CONTROLLED AMMUNITION FEEDING MEANS FOR GUNS

William Summerbell, Washington, D. C.; Edith May Summerbell, executrix of said William Summerbell, deceased Application September 4, 1947, Serial No. 772,042

11 Claims. (Cl. 89—33)

(Granted under the act of March 3, 1883, as amended April 30, 1928; 370 O. G. 757)

The invention described herein may be manufactured and used by or for the Government for governmental purposes without the payment of any royalty thereon.

This invention relates to an ammunition feeding device for a gun, and more particularly to a mechanical means controlled by the recoil and counterrecoil movements of the gun for feeding a round of ammunition into the gun barrel chamber and then actuating the firing mechanism of the gun.

The extensive employment of mechanized and heavily armored implements of war has led to the requirement for a weapon that could be mounted and operated in a restricted space and yet could be capable of delivering sustained rapid fire of considerable power. Prior attempts to produce such weapons have led to automatic firearms most of which have been of rather complicated and of space consuming construction, mainly due to the means employed for automatically feeding the ammunition to the weapon as required.

It is, therefore, an object of this invention to provide a mechanical feeding mechanism that may be installed upon existing guns without increasing by any substantial amount the total space requirements of the gun for the operation thereof.

An additional object is to add the mechanical feeding mechanism to an existing semi-automatic weapon whereby, with but slight modification thereof, the weapon is converted into an automatic weapon of simple and efficient construction and capable of economical manufacture.

Another object is to provide an interlocking device for holding the mechanical feeding device inoperative upon the failure or lack of supply of ammunition to the feeding device.

It is a further object to incorporate safety features into the mechanical feeding device whereby the breech mechanism of the gun can be manually opened independently of the feeding device and whereby the same may be held inoperative.

Still another object is the inclusion of a trigger mechanism for cooperation with the breech mechanism of a gun for automatically firing the weapon after the breech mechanism has been closed.

A further additional object is to provide the trigger mechanism with selective control to obtain automatic or semi-automatic fire or to lock the weapon in "safe" position.

A still further object is to provide a means for preventing displacement of a round of ammunition in the feeding device until the same has carried the round a predetermined distance towards the barrel chamber.

A preferred embodiment of the instant mechanical feeding mechanism employs an ammunition tray which after receiving a round of ammunition is moved into a gun loading position substantially at the termination of the counterrecoil movement of the gun to battery position. Upon the tray reaching the loading position, a linkage system is activated to release a cocked rammer to slide the round of ammunition off the tray and into the gun chamber. The closing of the breechblock, after the round is chambered, in turn, results in the removal of the ammunition tray from the path of the recoiling gun barrel which moves the rammer to its rear cocked position preparatory for loading the next ammunition round.

Another object is the provision of an automatic gun mechanism which may be cleared of a "dud" round and placed again in operation with ease, such operation being capable of being carried out by direct manual operation or by hydraulic or other remotely controlled means.

The exact nature of the invention as well as other objects and advantages thereof will be apparent from the following description and the accompanying drawings wherein:

Fig. 1 is an elevational view of the right, or loading, side of the ammunition feeding device attached to a gun with the recoiling parts thereof in battery position preparatory to firing and the ammunition tray of the feeding device in position to receive a round of ammunition;

Fig. 2 is an elevational view of the left side of the structure shown in Fig. 1;

Fig. 3 is a plan view of the structure illustrated in Figs. 1 and 2;

Fig. 4 is a sectional view taken through the rear end of the weapon at line 4—4 of Fig. 2;

Fig. 5 is a view similar to Fig. 4 but showing the ammunition tray depressed to gun loading position and the breech opened preparatory to shifting a round of ammunition into the gun chamber by the rammer mechanism;

Fig. 6 is an inside elevational view of the left side plate of Figs. 2 and 3 showing those parts of the feed mechanism supported by the plate, said aprts being in a position corresponding to Figs. 1 to 4, inclusive;

Fig. 7 is a view similar to Fig. 6, but showing the ammunition tray in the gun loading position corresponding to Fig. 5;

Fig. 8 is an inside elevational view of the right side plate of Figs. 1 and 3 showing those parts of the ammunition feed mechanism supported by the plate, particularly the rammer mechanism which is shown in its rearward cocked position corresponding to Fig. 5;

Fig. 9 is a sectional view taken on line 9—9 of Fig. 2 disclosing details of the rammer latch assembly for holding the rammer in the cocked position of Fig. 8;

Fig. 10 is a vertical sectional view on line 10—10 of Fig. 8;

Fig. 11 is a horizontal sectional view taken through line 11—11 of Fig. 10;

Fig. 12 is a vertical sectional view on line 12—12 of Fig. 3;

Fig. 13 is a vertical sectional view on line 13—13 of Fig. 3;

Fig. 14 is an enlarged partial plan view of the rear end of Fig. 3 illustrating the action of the cartridge tray locking lever;

Fig. 15 is a vertical sectional view on the line 15—15 of Fig. 3;

Fig. 16 is a vertical sectional view taken through the forward part of the cartridge tray at line 16—16 of Fig. 3;

Fig. 17 is a perspective view of the cartridge tray holding pins shown in Figs. 15 and 16;

Fig. 18 is a schematic view of the devices for holding the feeding mechanism inoperative;

Fig. 19 is a detached rear end elevational view of the sectional breechblock operating cranks shown in Fig. 4;

Fig. 20 is a schematic view in elevation of the parts in Fig. 2, but with the left side plate removed, showing the relationship between the cranks of Fig. 19 and the remaining structure of the weapon;

Fig. 21 is a vertical sectional view through the lower portion of the breech mechanism on the line 21—21 of Fig. 4;

Fig. 22 is a side elevational view of the slide operating crank, as viewed from 22—22, of Fig. 19;

Fig. 23 is a rear elevational view of the crank of Fig. 22;

Fig. 24 is an enlarged and fragmentary side elevational view, with certain parts in section, of the trigger mechanism shown assembled to the left side plate in Figs. 6 and 7;

Fig. 25 is a sectional view taken through the trigger mechanism at line 25—25 of Fig. 7;

Fig. 26 is an enlarged sectional view of the trigger mechanism taken on line 26—26 of Fig. 25, the firing selector control being set for automatic fire;

Fig. 27 is a view similar to Fig. 26 but with the firing selector control set for semi-automatic or single-shot fire;

Fig. 28 is a view similar to Fig. 26 but with the selector control being set in "safe" position;

Fig. 29 is a plan view of the selector;

Fig. 30 is an elevational view of the selector as seen from line 30—30 of Fig. 29;

Fig. 31 is a sectional view of the selector taken on the line 31—31 of Fig. 29.

Fig. 32 is a sectional view of the selector on line 32—32 of Fig. 29;

Fig. 33 is a plan view of the tripper guide housing per se of Figs. 6 and 24 to 28, inclusive;

Fig. 34 is a side elevational view of the guide housing of Fig. 33;

Fig. 35 is a side elevational view of the end portion of the tripper guide shown in Figs. 6 and 24 to 28, inclusive;

Fig. 35a is a plan view of the guide shown in Fig. 35;

Fig. 36 is a plan view of the tripper shown in Figs. 24 to 26, inclusive;

Fig. 37 is a left side elevational view of the tripper of Fig. 36;

Fig. 38 is a front end elevational view of the triper of Fig. 36;

Fig. 39 is a perspective view showing the installation of the cartridge tray pin of Fig. 17;

Fig. 40 is a sectional view through line 40—40 of Fig. 5;

Fig. 41 is a sectional view taken on line 41—41 of Fig. 3 showing the firing pin mechanism in the breech, as well as of some of the selector parts of Fig. 26, with the tripper of Fig. 38 moving into position to fire the gun;

Fig. 42 is a view similar to Fig. 20 but showing the position of various parts when the breechblock is down (breech opened); and Fig. 43 is an exploded view of the breech operating cranks of Fig. 19.

For the purpose of describing the present invention, reference is made to a weapon which is basically similar to that type disclosed in the patent to Summerbell, No. 2,398,453, issued April 16, 1946, for Breechblock Mechanism. A weapon of this type has a barrel 1 installed in a sleigh 2 which slides on a non-recoiling portion 3 of the weapon and thus supports the barrel 1 for movement away from and to battery position. To the rear end of the barrel is attached a breech ring 4 which has depending lugs 5 secured to a piston rod of a recoil cylinder, not shown, by a bolt 6 (Figure 4).

The breechblock mechanism and the mechanical means for opening and closing the breechblock is similar to the patented structure. Briefly, this includes a cam bracket 7 (Fig. 8) which is secured to a non-recoiling portion 3 of the weapon by bolts 8. A rod 9 (Figure 2) mounted in lugs 9a depending from the breech ring 4 rotatably supports a pair of multi-lever hollow crank shafts 10 and 11 (Figs. 19 and 43).

The cam bracket 7 is provided with a longitudinal track 12 in which slides a guide rail 13, the rail 13 being secured to the breech ring 4, sliding therewith but preventing relative rotation between the gun barrel 1 and the remainder of the weapon. (See Figure 4.)

The cam bracket 7 is also provided with an upper cam plate 14 and a lower cam plate 15 for rotating the crankshafts 10 and 11 which, in turn, raises and lowers a breechblock 16 through an arm 17. (See Figure 21.) A spring mechanism 18 provides the counterbalancing and closing means for the breechblock 16. The operation of these parts is fully described in the aforementioned patent.

The invention, as soon will become apparent, may be applied to weapons other than the type referred to above and the weapon represented by the above-mentioned patent has been chosen only to illustrate, and not to limit, the applicability of the invention. For this reason, further details of the weapon are not described as it forms no part of the present invention. However, where certain parts of the weapon are modified or employed to actuate or to mount the ammunition feed mechanism, such parts will be described and illustrated sufficiently for the understanding of the present invention and its installation upon a weapon.

This invention which provides for automatic loading and firing of a gun utilizes a left plate 19 (Figs. 3, 6 and 7) secured to the left side of the non-recoiling portions 3 of the weapon by bolts 19b. A right plate 20 (Fig. 8) is secured to the cam bracket 7 by bolts 20a.

A bridge 21 (Figure 3) spans the space between the plates 19 and 20 and is attached to each at their front portions by any suitable means, such as riveting or welding. A rear wall 22 is provided between plates with flanges 22a which are inserted between the rear portions of these plates and fastened to them by any suitable means, such as bolts 22b.

The left plate 19 (Figs. 6 and 7) carries spaced pivot studs 19a on which are mounted for swinging movement a pair of bell cranks 23 and 24. Each bell crank is provided with supporting arms 23a and 24a, substantially midway of which each are provided with keyhole-shaped apertures 23b and 24b. The apertures 23b and 24b receive spindles 23c and 24c located respectively on a front slide 25 and a rear slide 26. The front slide 25 is slidably mounted in a front guide 27 suitably secured against the inside of the left plate 19. The rear slide 26 is similarly mounted in a rear guide 28 also suitably fastened to the inside of the left plate 19. The spindles 23c and 24c on the slides 25 and 26 are preferably formed with enlarged heads capable of passing through the large ends of the keyhole apertures 23b and 24b during assembly of the parts but are ultimately positioned in the slotted portion of the keyholes (Fig. 6) so that during normal operation, the neck of each spindle 23c and 24c reciprocates in the slotted portion of each aperture as the arms 23a and 24a are swung about their respective pivot bolts 19a. The end portions of the arms 23a and 24a are laterally offset, as shown in Fig. 3, in the direction of the axis of the barrel 1. Each arm 23a and 24a is further provided with an opening or bore 29 having a keyway 30 (Fig. 1).

The offset end portions of the arms 23a and 24a fit within bifurcated lugs 31 (Figs. 3, 15 and 16) of yokes 32 and 33 which securely embrace a cartridge tray 34, and, as best shown in Fig. 39, outer bifurcation 35 of each lug 31 is formed with a pin receiving bore 36 provided with a keyway 37.

Each of the arms 23a and 24a is pivotally retained between its lug 31 by a pin 38 (Figs. 15, 16, 17 and 39) having a key 38a. The pin 38 is journalled in the aligned bores 29 and 36 with the key 38a within the keyway 37.

The keyway 37 (Fig. 39) is normally out of alignment with the keyway 30 in the arms 23a and 24a and it is only in alignment when these arms are in a depressed position somewhat beyond that shown in Fig. 1 at which time the pin 38 can be fully inserted or removed. During normal operation the keyways 30 in the arms 23a and 24a will be obstructed by the inner face of the bifurcation 35 thereby preventing disassembly of the tray and as the keyways 30 and 37 are but momentarily in alignment as the tray swings downward there is no danger of inadvertent or accidental separation of these parts.

The cartridge tray 34 is a tubular member of suitable diameter to receive a cartridge 3a and, as shown in Fig. 6, provided with a longitudinally cut-out portion having a configuration roughly corresponding to the profile of the cartridge whereby the same may be placed on the tray as will appear further.

The cartridge tray 34 is swung, in a substantially vertical plane containing the axis of the barrel 1, by the arms 23a and 24a from the elevated (cartridge receiving) position, shown in Fig. 1, to a depressed (gun loading) position, shown in Figs. 5 and 7, wherein the axes of the cartridge tray and barrel bore become aligned preparatory to shifting a cartridge from the tray 34 into the barrel chamber in a manner to appear.

Each bell crank 23 and 24 includes arms 39 and 39a respectively angularly offset at generally a right angle to its other arm 23a and 24a respectively. The levers 39 and 39a are pivoted to a link 40 (Figs. 3 and 7), which is provided at its forward end with a laterally extending cam 41 for a purpose to be hereinafter described. A spring housing 42 (Fig. 7) is pivoted to the rear lever 39a and telescoped over a spring case 43 which has pivotal engagement with a post 44 fixed to the left plate 19. A compression spring 45 is confined within the housing 42 and the case 43 and imposes a yielding force tending to rotate rear lever 39a counterclockwise, as viewed in Fig. 7, to bias and, when conditions permit as to appear later, to move the cartridge tray to its depressed (gun loading) position.

A hand lever 46 (Fig. 7) is pivotally mounted near the front end of the left plate 19 on a stud 46a and carries a button 46b for engagement with a reciprocable part of the spring mechanism 18 for manually opening the breech in a manner and for reasons to appear later.

A link 47 is pivoted on the handle 46 at 46c (Figs. 6 and 7) and is pivotally connected to a lug 48b fixed to one side of a blade 48 (Figs. 18, 24, 26, 27 and 28) which is reciprocably mounted in a groove 48a (clearly shown in Fig. 33) formed in the face of a tripper guide housing 49. The tripper guide housing 49 is secured to the left plate 19 by any suitable means, such as the rivets 49a, just forward of the front slide 25. (See Figure 6.)

As shown in Figs. 33 and 34 (and in section in Figs. 25, 26, 27 and 28), the tripper housing is formed with a substantially rectangular plate portion 49b from which extends laterally a tubular guiding sleeve portion 49c merging into a substantially rectangular guiding box 49d, the opposed walls of which have aligned bearing openings 49e. Depending from the rearward portion of box 49d is a lug 49f. The open groove 48a extends across both the plate portion 49b and lug 49f. The tripper housing thus coacts with the left plate 19 to retain the blade 48 in the groove 48a.

The front slide guide 27 (Fig. 18) is cut away as at 50 to expose a ledge 51 formed in and adjacent the bottom of the front slide 25. Thus when hand lever 46 is pivoted counterclockwise as seen in Figures 26, 27 and 28, slide 48 is moved rearwardly beneath ledge 51 to thereby hold slide 25 in the elevated position shown at Figure 6. The hand lever 46 is shifted counterclockwise, as viewed in Fig. 6, when it is desired to manually open the breechblock, and when so moved, it will, through the link 47, push the blade 48 under the ledge 51, thus holding the cartridge tray 34 in its uppermost position (Fig. 6), above and out of the way of the opened breech for the hand ejection or chambering of a round of ammunition.

The bridge 21, which spans the distance at the front ends (Fig. 3) of the plates 19 and 20, has a transverse depending flange (Figs. 1, 8 and 9) 52 provided with an aperture 53 through which extends a rammer guide housing 54.

The rammer guide housing 54 (Fig. 8) is an elongated sleeve having threaded thereon a nut 55, which when tightened, draws a flange 56, rigidly attached to the sleeve 54, against the front face of the flange 52 thereby locking the rammer guide housing 54 to the bridge 21. A lock nut 57 is also provided as an added precaution. The housing 54 is also supported intermediate its length on the right plate 20 by any suitable means, such as the rectangular block 58 (Fig. 3), having a concave surface (Fig. 12) welded or otherwise secured to the housing 54, which is threadably engaged by a screw 59 passing through the right plate 20. The rammer guide housing 54 near the rear end thereof is provided with a yoke 60 (Figs. 4 and 40) having a pair of laterally extending feet 61 secured to the right plate 20 by screws 62 passing through apertures in the feet 61.

As illustrated in Fig. 8, that portion of rammer guide housing 54 facing toward the cartridge tray 36 has a longitudinally extending slot 63. Slidable in housing 54 is a concentric tubular rammer sleeve 64 (Figs. 4, 8, 10 and 11), and extending laterally from this tubular rammer sleeve 64 and through the slot 63 (Figs. 4, 8 and 5), is a lug 65 (Figs. 4 and 5). Closing the rear end of the housing or sleeve 54 is a cap 66. Adjacent the cap 66 and within the housing 54 is a buffer disc block 66a for absorbing the recoil of the rammer sleeve 64 at the end of its rearward movement caused in a manner to be explained. Anchored centrally in the cap 66 is a guide rod 67 extending longitudinally and concentrically with the sleeves 54 and 64 (Fig. 11).

Wrapped about the guide rod 67 is a coiled rammer spring 68 extending between the cap 66 and a bushing 69 secured in the front end of the rammer sleeve 64 biasing the rammer sleeve 64 to the front end of the housing 54. As shown in Figs. 8, 10 and 11, rammer guide housing 54 adjacent its front portion and on the side next to the right plate 20 and underneath the bridge 21 has a portion of its walls slotted to form a substantially square opening 70 facing a flange 71, depending from bridge 21 and secured to plate 20, on which is secured a bracket 71a for pivotally supporting a flat plate or latch 72 for swinging into and out of the aperture 70.

When swung into the aperture 70, the latch 72 is projected into the path of the tubular rammer sleeve 64, as shown by sectional views of Figs. 10 and 11, to catch the rammer sleeve 64 and hold it in a cocked position (Fig. 8) against the action of the compressed spring 68. The face of the rammer sleeve 64 next to the right plate 20 is formed with a flat surface 73 (Fig. 12) which commences adjacent the front end of the rammer sleeve 64 and runs practically its full length, to provide clearance between the sleeve 64 and the latch 72 thereby eliminating any pressure upon the sleeve 64 by the latch 72 which would retard rearward movement of the sleeve 64.

The front end of the rammer sleeve 64 is provided with a latch engaging foot 74 (Fig. 11), preferably reinforced by an inlay 75 of a suitable hard metal. The latch 72 is provided with a similar inlay 76 at its rear face for engagement with the rammer foot 74.

The top of the rammer latch 72 (Figs. 9 and 10) is provided with a narrow lug 72a having secured therethrough a cross pin 77 which is engaged by a hook 78 formed on a latch operator rod 79 reciprocable in a bore 80 formed in a transverse boss 80a of the bridge 21. The inner end of the latch operator rod 79 terminates in a hook portion 81 engageable with a similar hook portion 81a on a plunger rod 82, which is also reciprocable in the bore 80 and engaged by a spring 83 which biases the plunger rod 82, and thereby the latch operator rod 79, to the left, as viewed in Figs. 5 and 10 or downwardly as viewed in Fig. 9, projecting the rammer latch 72 through the slot 70 and into the path of the rammer sleeve 64, as shown in Figs. 10 and 11.

The outer end of the plunger rod 82 (Fig. 9) is formed with a follower 84 for engagement by the cam 41 on the front end of the link 40, when this link is shifted rearwardly (Fig. 3) during the lowering of the cartridge tray 34 into gun loading position (Fig. 7).

The cam 41 will contact the follower 84 only when the tray 34 is in its depressed (gun loading) position (Fig. 7) and only at that time will the plunger rod 82 be shifted in the bore 80, to compel the latch operating rod 79 to swing the latch 72 away from the rammer sleeve 74 to release the same for movement by the spring 68 to shift a cartridge from the tray 34 into the barrel chamber.

The lug 65 (Figs. 4, 5 and 8) on the rammer rod 64 pivotally carries a rammer head 85 in which is slidably mounted a spring-pressed detent 86 for selective engagement with notches 87 formed in the lug 65 to releasably secure the rammer head 85 in either a lowered position (Fig. 5) preparatory to sliding a cartridge off the cartridge tray 34, or a raised position (Fig. 4) to permit the extraction of a fired cartridge case when the breechblock 16 is opened. In a manner to appear, the rammer head 85 is moved from the lowered position (Fig. 5) to the raised position (Fig. 4) by the breechblock 16 when it is lifted to a closed position in the conventional manner by the chambering of a cartridge.

When the gun is loaded and ready to fire, the rammer head 85 is in the position of Fig. 4, with the front face of the rammer head 85 abutting the breech face of the breech ring 4. As the gun recoils upon firing, the recoiling breech ring 4 will drive the rammer head 85 to the rear, and likewise the rammer sleeve 64 which carries the lug which pivotally supports the rammer head 85. The combined weight of the rammer sleeve 64 and head 85 is great enough so that the velocity imparted to them by the recoiling breech ring 4 is sufficient to cause the rammer head 85 to overrun the distance traveled by the gun in recoil.

The buffer disks 66a cushion the end terminal movement of the rammer head 85. To further cushion the shock of recoil and to prevent excessive rebound from the buffer disks, the lug 65 (Fig. 40) has the upper portion provided with an undulated surface 65a adapted to ride under a housing 60a secured to the yoke 60. The housing 60a contains a ball 60b forced against the corrugated surface 65a by a plunger 60c urged outwardly of the casing by a spring 60d. The ball 60b thus firmly engages with the undulated surface 65a to prevent the rammer head 85 from rebounding forwardly. In this rearward position, the rammer head 85 is raised and directly underneath a rearwardly extending vertically arranged plate 33a (Figs. 4, 6 and 14) carried by the rear yoke 33 supporting one end of the cartridge tray 34.

As may be seen from Fig. 4, the rammer head 85 will then be beneath the raised cartridge tray and will be knocked down by plate 33a of the tray to the position shown in Fig. 5 when the tray descends. In this lower or gun loading position the tip of the rammer head 85 is aligned with cut-out portion of the tray and is adapted to extend into the cartridge tray 17 to engage and shift the cartridge.

When the rammer sleeve 64 (and thereby the rammer head 85) is released by tilting the latch 72 toward the right plate 20, the rammer spring 68 will drive the rammer sleeve 64 forwardly and the rammer head 85 will pass through the open side of the tray 34 to move the cartridge into the chamber of the barrel 1. Seating of the cartridge in the barrel chamber will trip the extractors allowing the breechblock 16 to move to its closed position, and in so doing, its upper curved face will turn the rammer head up to its position shown upon Figure 4.

The wall 22, which is secured between the rear ends of the right and left plates 19 and 20 has formed on its lower part a curved deflecting surface 89 (Fig. 1) designed to deflect downwardly cartridges ejected by the extractors in the usual manner from the barrel chamber. The upper part of the housing wall 22 has a support 90 on which is supported a normally vertical pin 90a about which is pivoted a substantially T-shaped latch 91. The top of the latch has a stop lug 90b which limits the swinging movements of the latch finger 91a (Fig. 14) which is biased by a spring 91b, in a clockwise direction to place the finger 91a in position to engage in a notch 92 (Figs. 4 and 14) formed in the rear cartridge tray yoke 33. The finger 91a extends into the tray a distance such that it can be engaged by the rim of a cartridge. When a cartridge is within the tray, it forces the finger 91a, against the resistance of the spring 91b, out of engagement with the notch 92 as shown by the broken lines in Fig. 14. If no ammunition is fed into the cartridge tray 34, or if for any other reason there is a failure in the supply of ammunition, the latch finger 91a will remain in the notch 92 and prevent the tray 34 from descending and thereby rendering the feed mechanism inoperative.

The rear end of the cartridge tray 34 (Figs. 1, 6 or 7) stops short of the rear wall of the yoke 33 thereby in effect forming notches 93 and 93a at top and bottom to allow the cartridge to pass into the tray with the cartridge rim fitted in the notches 93 and 93a. Lips 94 at the front of the tray 34 provide sufficient room for the passage of the projectile at its reduced end. Any forward motion of the cartridge within the tray 34 will place the cartridge in such position that it cannot be withdrawn from the side of the tray. However, excessive forward movement during the descending of the tray would extend the ammunition round beyond the end of the tray 34 and thus strike the breech ring, thereby interfering with the lowering of the tray 34. Such forward movement during the initial descent of the tray is prevented by a cartridge retaining pin 95 (Fig. 14) which is anchored in the offset portion of the rear supporting arm 24a. The pin 95 projects into the tray, when the tray is up, and into the path of the cartridge rim to prevent substantially relative axial movement between the cartridge and the tray. The prevention of such relative movement is particularly important during the interval that the tray is raised and the gun is depressed or is subjected to severe shocks as it might be in a tank. As the tray 34 swings downward to a gun loading position, the pin 95 will be elevated from its position in Fig. 6, relatively to the cartridge and thus be moved out of the path of the cartridge rim, to that shown in Fig. 8 to free the cartridge for forward movement by the rammer head 85.

Any desired feeding means may be provided, including hand feeding, for laterally inserting cartridges into the tray 34 when the tray is in its upper position (Fig. 6) and restraining the cartridges within the feeding means while the tray completes its cycle of operation in positioning a cartridge for ramming into the barrel. For convenience in mounting such cartridge feeding means, a flat portion 97 has been formed on the upper face of the rammer guide housing 54 (Fig. 3) so as not to interfere with feeding directly from the side. As this cartridge feeding means does not form a part of the invention, further description is not included. However, it should be mentioned that an abutment on the cartridge feeding means extends beyond the right side plate 20 toward the cartridge tray 34, being shown in phantom lines in Fig. 14 and identified by the reference number 96. As the cartridge tray swings downward it will travel slightly rearward along the arc of a circle centering on the stud 19a. This rearward component of motion will cause the cartridge to strike the abutment 96. However, as explained above, at this position of the tray the pin 95 will have been withdrawn and the abutment 96 will push the cartridge forward in relation to the tray to a position in which the cartridge cannot be displaced laterally from the tray and on further lowering of the tray the base of the cartridge will be transferred from the abutment to the forward face of the rammer in alignment therewith.

The breech mechanism, as was previously stated, is similar to that shown in the aforementioned Patent No. 2,398,453. By way of reiteration, the breechblock 16 is engaged by a crank arm 17 whereby rotatory motion of arm 17 about the axis of the shaft 9 vertically reciprocates the block. A depending arm 101 on the breech crank has a stud 101a which engages the cam track formed between the curved spaced edges of cam plates 14 and 15 (Figures 4 and 20) on the fixed cam bracket 7 as the gun recoils rearwardly, thereby dropping the breechblock (Fig. 42). The crank is also provided with a laterally extending stop portion 104 on the crank arm 17 which engages the breech ring lugs 5 when the breechblock is fully lowered to positively limit its downward motion.

As shown in Fig. 21 the crank arm 17 is provided with a spring pressed detent 105 which projects into a groove 100a (Figure 43) in the rod 9 to properly locate the hollow crank shaft 11 and thereby the crank arm 17, longitudinally of the shaft 9.

Also received on the shaft 9 and journaled in the left depending lug 9a (Fig. 5) on the breech ring is the second hollow crankshaft 10 which has a coupling segment 108 engaging a complementary segment 109 on the breechblock crankshaft 17. As a result, the crank members 10 and 11 are constrained to rotate with each other on the shaft 9 which, as noted in Fig. 5, has one end journaled within the crank member 10 and its other end journaled in the right depending lug 9a. The assembly of the crank members 10 and 11 removed from the breech ring is shown in elevation in Fig. 19 and in perspective in Fig. 43. The crank member 10 has an upwardly extending crank arm 111 which (Fig. 20) is coupled by a link 112 to a spring rod 113 of the spring mechanism 18. The forward end of the spring rod 113 is provided with a nut 113a (Figs. 2 and 7) confining a spring 114 between it and an abutment in the spring casing 115 secured to the breech ring 4. The nut 113a is positioned directly opposite to the button 46b on the operating handle 46. Thus, moving the handle 46 rearwardly (clockwise in Fig. 2) will compress the spring 114 and through the rod 113, link 112 and crank 111 open the breechblock. As described in the aforementioned Patent No. 2,398,453, or in any other convenient manner, the breechblock 16 is latched in the open position (Fig. 42) by engagement of its extractor lugs, not shown, with a convenient abutment on the breechblock 4. The insertion of a cartridge into the barrel chamber will operate to release this engagement and allow the breechblock 4 to be raised to a closed position by the action of the spring 114. The second crank member 10 differs from its equivalent in the aforementioned patent by the addition of a generally rearwardly extending arm 116 provided with a laterally extending lug 117 adapted when the gun is in battery position to engage the underside of the thickened laterally extending foot portion 118 (Figs. 2, 4 and 5) formed on the bottom of the front slide 25. This arm 116 is also shown in phantom lines on Figs. 6 and 7 in the positions it would occupy in relation to the front slide 25 during the raised and lowered positions of the tray 34.

After a cartridge has been rammed into the barrel chamber, it will trip the extractors to allow the breechblock 4 to be raised by the spring mechanism 18, as already explained. Upward movement of the breechblock 16 will, through its crank arm 17, rotate the crank member 10 which, in turn, tilts arm 116 upwardly (Figs. 4 and 6) pushing the front slide 25 to positively raise the cartridge tray 34 to the position shown in Fig. 6.

In the event it is desired to open the breechblock 16 manually, the hand lever 46 is actuated, as explained. However, during manual operation it is desirable that the cartridge tray 34 remain in raised position out of the path of the ejected cartridge case. This is accomplished through the blade 48, previously described, which will engage the ledge 51 (Fig. 18), to hold the front slide 25 against descending, which would happen when the breechblock 16 drops for it, in turn, swings the lug 117 downwardly to the dotted line position of Fig. 7.

Also, to insure the retention of the cartridge tray 34 in its raised position of Figs. 2, 4 and 6, a rail 119 (Fig. 2 and 18) is secured to the spring casing 115 and extends rearwardly therefrom to a position adjacent the front slide foot 118. The rail 119 reciprocates with the gun during recoil and in so doing it will slide under the foot 118 of the front slide 25 to prevent the latter from sliding downwardly and thereby the cartridge tray from swinging downwardly in the way of the recoiling barrel. The rail 119 clears the foot 118 just prior to the completion of counterrecoil movement of the gun, after which the slide 25 is permitted to descend into gun loading position to align a cartridge with the barrel chamber.

The firing mechanism forms no part of the present invention except insofar as it cooperates therewith. Therefore a mechanism similar to the type assembly shown in the aforementioned Patent No. 2,245,623, may be employed, and, as shown in Fig. 41, it includes a cocking lever 120 pivoted on the breechblock 16 by means of a pivot 120a. The upper extremity of this cocking lever 120 is curved rearwardly and rides on the breech ring 4 when the breechblock 16 is lowered to retract a firing pin 120b against a compression spring 120c. The firing pin 120b is thus moved rearwardly with its depending cam lug 120d. During this retraction, the cam lug 120d shifts the sear 121 laterally in the breechblock 16 and against the action of a sear spring 121a. When the cam lug 120d clears the sear 121, it is restored to its original position by its sear spring 121a and is thus interposed in the path of the cam lug 120d holding the firing pin 120b in cocked position as shown in Fig. 41. The sear 121 has a downwardly projecting arm 122 slidably received within a recess 123 in the breechblock to prevent rotational movement of the sear 121. The sear 121 has an outwardly projecting cam member 124 which, when the breechblock 16 is closed (raised), is in alignment with a firing plunger 125.

The firing plunger 125 is reciprocable from side to side in a transverse bore 4a in the breech ring 4 and adapted to be extended beyond either of its sides. The firing plunger 125 may assume different shapes but, as shown in Fig. 41, the plunger consists generally of a pair of cylindrical portions of different diameters and separated by an annular collar 125b which forms a seat for a return spring 125c, which biases the plunger 125 to the left in Fig. 41. The smaller cylindrical portion has flattened portions 125d reciprocable through an opening having an outline similar to the cross section of the portion of 125d to prevent rotation of the plunger 125. The tip of the plunger 125 protrudes slightly and has a cam surface 125e inclined downwardly and to the left for engaging the cam 124 for camming the sear 121 to the right to release the firing pin as the breechblock 16 moves into its closed position (Fig. 41). The opposite end of the plunger 125 is provided with a segment of a frusto-conical portion forming a follower 125f beyond the side wall of the breech ring (Fig. 25).

It should be noted that if the firing plunger 125 should be maintained in a depressed position in a manner to be explained, that is pushed to the right, as shown by the dotted lines in Fig. 41, against the action of the return spring 125c, the cam surface 125e will extend into the path of the sear cam 124. Hence, during the final increment of upward movement of the breechblock 16, the sear 121 will be cammed in (to the right) causing the lug 120d to be freed to fire the weapon immediately upon closing of the breech. This feature is utilized in connection with the automatic operation of the firearm as will appear from further description.

The follower 125f is in the path of a rearwardly tapered surface 126a (Figs. 25 and 41) of a tripper 126 (Fig. 41) during the final increment of movement of the breech in counterrecoil movement to battery position.

The tripper 126 (Figs. 36, 37 and 38) includes a flat plate portion 126b provided with a pair of spaced apertured ears 126c. From one ear extends a forwardly and upwardly curved arm 126d. The flat plate portion 126b carries an integral projection 126e adapted to ride on the inner face of the front slide 25 as the trigger mechanism is actuated for bracing the tripper against lateral displacement due to the component of force required to force the follower 125f of the firing plunger inward for firing.

The tripper ears 126c are pivoted within the box-like frame or carrier 127 by a horizontal pin 127a whereby the tripper is supported in the trigger carrier 127 attached to a connecting rod 128 reciprocable in the boss 49c (Fig. 34). A pivot pin 128a connects the connecting rod 128 to a trigger arm 129 by which the firing mechanism is operated. A coil spring 130 is received over the shank of the connecting rod 128 and is retained on it by a sleeve 128b, the spring 130 resting against a shoulder in the trigger housing 49 tending to yieldingly maintain the trigger guide 127 in forward position. From Fig. 25 it can be seen that when the cam face 126a of the tripper 126 is forced rearwardly by actuation of the trigger arm 129 it will engage the follower 125f of the firing plunger 125 to cam the firing plunger inward and fire the weapon.

A torsion spring 134, surrounding the pivot pin 127a, has one end anchored in this tripper 126 and its other end bearing against the carrier 127 to bias the upwardly curved arm 126d of the tripper 126 into sliding engagement with a selector 132 in a manner and for a reason to be presently described. The plate portion 126b of the tripper is provided on the vertical beveled face 126a with a beveled lower face 137. A small recess 138 is also provided on the lower face to provide clearance for the firing plunger follower 125f when the gun returns to battery position during semi-automatic firing.

When the weapon is conditioned for automatic fire, the tripper 126 will be retained in a rearward position shown in dotted lines in Fig. 25, and when the gun returns to battery position the firing plunger follower 125f will contact the face 126a of the tripper 126 forcing the plunger inward so that its cam surface 125e (Fig. 41) will engage the sear 121 and fire the weapon as soon as the breechblock has risen to closed position.

When the weapon is set for semi-automatic fire, the tripper 126 is caused to force the firing plunger 125 inwardly to actuate the sear 121, in a manner hereinbefore explained, and then immediately assume a position in which it cannot again engage the firing plunger follower 125f until the tripper is returned to a forward position and its rearward movement repeated. This function is analogous to that of the disconnector employed in most semi-automatic hand firearms.

To accomplish this last function, the selector 132 (Figs. 29, 30, 31 and 32) is utilized, it being oscillatably supported for motion about a horizontal axis in openings 49e (Fig. 34) of the tripper housing 49. The outer end of the selector 132, being of reduced diameter, protrudes through a bore in the left side plate 19 (Fig. 25) and is slotted to receive a selector arm 140 which is preferably of spring stock and has a tendency to hug the outer face of the left side plate 19. The extremity of the selector arm 140 is provided with a cone-headed selector arm pin 141 which passes through the selector arm 140 and has secured to its outer end a knob 142. The coned head of the selector arm pin 141 is adapted to bear selectively in either of recesses 143, 144, or 145 (Fig. 2) in the left side plate 19, depending upon the type of fire desired. Recess 143 provides for automatic fire and positions the selector arm 140 as shown in Fig. 26. Similarly, recess 144 provides for single shot (semi-automatic) fire and positions the selector arm 140 as shown in Fig. 27, while recess 145 locates the selector arm 140 for locking the firing mechanism, as shown in Fig. 28, against operation.

The selector 132, intermediate its journaled portions 132a and 132b is a half cylindrical shell formed with peripheral recesses 146 and 147 to provide a pair of axially and circumferentially spaced selector sectors 146a and 147a, as best shown in Figs. 29 to 32.

Referring to Figs. 35 and 35a, the box-like carrier 127 is formed with the longitudinal side walls 148 and 149. The side wall 148 has a plateau portion 148a merging into a semi-circular depression 150. The opposite side wall 149 has an elongated notch provided with a flat portion which lies slightly below a plane tangent to the depression 150.

Now, referring to Fig. 25, the recess 147 is aligned with and above the side wall 148 of the box-like carrier 127; the recess 146 with and above the upwardly curved arm 126d. The sector 147a is above the side wall 148 and when rotated downwardly in Fig. 25, it will engage in the segmental notch 150 (Fig. 28) to hold the box-like carrier 127 against any shifting movement.

The inner selector sector 146a is shown in section in Fig. 32 and it is taken in a plane corresponding to that in which the sectional view of Fig. 26 is taken. In this position, that is the position shown at Fig. 26, the selector 132 is set for automatic fire which places the sectors 146a and 147a above the side walls 148 and 149 of the box-like structure (Fig. 25) thereby out of the path of these walls permitting the box-like structure 127 to be shifted to the rear, as shown by the dotted lines in Fig. 25, by the trigger 129 to its fullest extent. Likewise, in this position of the selector 132, the curved arm 126d on the tripper 126 is free to reciprocate horizontally through the recess 146, the torsion spring 134 holding the tripper 126 horizontally in which position it will force the firing plunger 125 inward of the breech ring 4 and continued to do so as often as the gun completes its counter-recoil movement until the trigger arm 129 is released.

When the selector is rotated 90° counterclockwise from its position in Fig. 26 to that of Fig. 27 (also shown in Fig. 24), the inner sector 146a will have been moved into position to obstruct the path of the curved arm 126d on the tripper 126. Thus, the sectors 146a and 147a are above the axis of the selector 132 and offer no interference to free reciprocation of the trigger guide 127. As the tripper 126 is moved from its position in Fig. 24 to that of Fig. 27, the arm 126d strikes the sector 146a forcing the tripper 126 to rock clockwise about its pivot as seen at Figure 27.

Thus, the tripper 126 is tilted while being shifted to the rear, and will wipe across the follower 125f on the firing plunger 125 to assume the tilted position shown in Fig. 27. Thus, for the brief interval that the tripper 126 wipes across the follower 125f, the plunger 125 will actuate the sear 121 and immediately become disengaged from the projection 125f. This projection in returning to its original position will be received within the recess 138 when the gun returns to battery position. When the trigger arm 129 is allowed to return to forward position the tripper 126 rides forward over the projection 125f and when it has cleared, it will drop down into the position shown in Fig. 24 preparatory for a subsequent actuation of the trigger 129.

By rotating the selector 132 from its position of Fig. 27 to that in Fig. 28 (180°) the weapon is placed in "safe" position, that is, the trigger cannot be actuated. This is due to the outside sector 147 being dropped into the recess 150 in which position it effectively bars any movement of the trigger guide 127 and associated parts.

Operation

*To obtain automatic fire.*—Assume that the gun is in battery position with a round of ammunition in the chamber and the cartridge tray 34 elevated (Figs. 1, 4 and 6). The selector arm 140 is set to recess 143 (Figs. 25 and 26) for automatic fire and under these conditions the sectors 146a and 147a are above the walls 148 and 149 freeing the box-like tripper carrier 127 for movement to the rear. Hence, when the trigger arm 129 is pulled back (counterclockwise in Figs. 6, 7 and 26), the tripper 126 is pushed horizontally rearward. The beveled face 126a on the tripper will engage the follower projection 125f of the firing plunger 125 and force it laterally into the breech ring 4 (Fig. 41) engaging the cam portion 124 of the sear 121, causing the release of the firing pin mechanism to strike the primer of the cartridge to explode the same.

As the gun barrel recoils, the laterally extending lug 117 (Figures 2 and 43) is moved from underneath the foot 118, but is immediately replaced by the rail 119 which is simultaneously shifted, as indicated by the broken lines in Fig. 41. Were it not for the presence of the rail 119, the foot 118 would drop upon the removal of the lug 117 which, in turn, would permit the spring 45 to drop the cartridge tray into the path of the recoiling breech ring. However, this is avoided by the rail 119 which is of sufficient length to remain under the foot 118 (and its slide 25) during the time the lug 117 is moving rearwardly in recoil and forwardly in counterrecoil to battery position.

As explained in the aforementioned Patent No. 2,398,453, during the recoiling movement, the crank pin 101a of the cam engaging arm 101 will ride between the cam plates 14 and 15 causing the crank arm 17 to be rotated (from position shown in Fig. 20) in a clockwise direction (to the position shown in Fig. 42), as viewed from the left side of the gun, opening the breechblock 4, cocking the firing mechanism by engagement of the cocking lever 120 with the breech ring, extracting the fired cartridge and compressing the closing spring 114. Extractor arms, not shown, will engage the breechblock 4 and lock the same open during the return of the gun barrel to battery position, the crank pin 101a traveling during counterrecoil above the cam plates 14 and 15. Also, during the recoil stroke the rammer head 85, raised as in Fig. 4, will be thrown to the rearward, as the head of the rammer at the time of firing is in contact with the breech face. The velocity imparted to the rammer is sufficient to carry it to the limit of its rearward movement in spite of the fact that the recoil movement of the gun barrel is of considerably less length. As the rammer arrives at its rearward position the rammer latch 72 engages the front end of the rammer sleeve 64, to secure the same (Figs. 10 and 11).

With the breechblock 4 now held open (down), the transverse lug 117 is likewise down (Fig. 42) and when this lug 117 is returned with the recoiling parts of the weapon back to battery position, the rail 119 will have slipped from underneath this foot 118 and the lug 117 will occupy the depressed position shown by the dotted lines in Fig. 7 whereupon the slide 25 is freed for downward movement to its position shown in Fig. 7.

Upon this release of the front slide 25 the cartridge tray will begin to descend under the force of the spring 45. However, if no cartridge is in the cartridge tray 34, the pivoted finger 90 (Fig. 14) will lock the tray against descending movement.

With a cartridge in place in the tray, the rim of the cartridge will deflect the finger 90 outwardly (to the left in Fig. 4 and also shown in broken lines in Fig. 14) to release the cartridge tray which will then be moved to a position axially aligned with the gun barrel 1 (Figs. 5 and 7).

As the tray descends, the flat plate 33a will engage the rammer head 85, tilting the same downwardly (Fig. 5). As the cartridge tray approaches the limit of its downward movement, the cam 41, on the link 40, will engage the cam 84 on the plunger 82 to disengage the latch 72 thereby releasing the rammer head 85 for forward movement.

Under the impetus of the spring 68 the rammer travels forwardly with the head 85 extending through the open side of the cartridge tray, pushing the cartridge into the barrel chamber.

As the rim of the cartridge strikes the extractor lugs, not shown, the breechblock 16 is released in the known manner, and is moved upwardly by the closing spring 114. The upper curved face 4 of the breechblock 16 will tilt upwardly the rammer head 85 (Fig. 4). As the block 16 is lifted by the breech closing spring 114 the lug 117 on the crank 116 will likewise be moved upwardly and by engaging the foot 118 of the front slide 25, it will raise the cartridge tray 34 to the elevated position to receive a new cartridge.

As automatic fire is desired, the trigger arm 129 will have been held in rearward position and upon the return of the gun barrel to battery position the tripper 126 will have engaged the firing plunger 125, camming the same into the breech ring. Hence, with each upward movement of the breechblock 16, the sear cam 124 (Fig. 41) will be engaged by the inner cam end 125c of the firing plunger and the cycle will repeat itself until the trigger is released or the supply of ammunition fails. In the latter case the failure to feed a cartridge to the tray will result in the latch 90 remaining in engagement with the notch 93 and interrupting the cycle of operations until a cartridge is placed in the tray.

*To obtain semi-automatic (single shot) fire.*—Preparatory to firing a shot with each pull of the trigger 129, the selector arm 140 is rotated until the selector arm pin 141 engages the recess 144 (Fig. 27). The sequence of operations is the same as for automatic fire except that the operating cycle ceases with the elevation of the cartridge tray 34 (Fig. 6), and the trigger 129 must be pulled again, whereupon the cycle will be repeated as often as the trigger 129 is pulled. Under these conditions, when the trigger 129 is pulled (rotated to the left in Fig. 27), the tripper 126 is moved rearwardly but in this case the curved arm 126d, of the tripper will engage the sector 146a rocking the tripper about its pivot and disengaging it from the firing plunger just after camming the plunger inward to fire the weapon. The operation of the loading equipment is the same as for automatic fire until the return of the gun to battery. If the trigger 129 should be inadvertently held in its firing position after a round has been fired, the tripper will remain in its rocked up-position and on counterrecoil the firing plunger follower 125f will be received in the recess 138 on the lower face of the tripper 126. Hence the firing plunger will be clear of the sear cam 124 and the breechblock would complete its closing movement without firing the cartridge. In order to fire a second shot it is necessary first to release the trigger arm and allow it to travel to its original position. As the trigger goes forward the tripper will ride over the top surface of the firing plunger follower 125f until it clears it whereupon it will drop down into position to reengage the plunger upon another actuation of the trigger.

*To open the breechblock manually.*—In the event it is found to be desirable or necessary to open the breech, as in the case of an empty chamber or a misfire, the hand lever 46 is actuated to the rear (counterclockwise in Fig. 6), resulting in the blade 48 (Fig. 18) being forced beneath the edge of the front ledge 51 of the front slide 25 to retain the tray in its upper position. Further movement of the lever 46 will place the button 46b into contact with the nut 113a on the forward end of the operating spring rod 113 compressing the spring 114 and opening the breech, whereby a new round may be chambered manually or the rammer may be cocked by manually moving it rearwardly. The lever 46 may then be restored to its forward position, and as the blade 48 disengages from the front slide 25, the slide will descend and automatic loading will take place as previously discussed. Any conventional form of latch or detent not shown, may be provided to releasably secure the lever 46 in either of its extreme positions to prevent inadvertent displacement thereof with possible interference with the operation of the weapon.

An important feature of convenience and safety of the instant invention is that in the event of a misfire due to a defective primer or other cause the weapon may be recocked without opening the breech or endangering personnel by exposure to a hand fire. The cocking lever 120 projects from the breech ring in position to be readily operated manually and permits of repeated attempts to fire a defective round without opening the breech.

A further feature of convenience which will be apparent is the ease with which the mechanism may be operated by remote control means. It may be noted that charging of the piece may be accomplished after a stoppage or initially by the performance of only two operations opening the breechblock and tensioning the rammer spring. Both operations may be readily completed by air or hydraulic pistons coupled to the respective parts and operated from any convenient point. The means of doing this are however not shown in this case as they are not deemed to be a part of this invention. Similarly, remote operating means may be provided to actuate the cocking or hand lever 46 and to control the trigger arm 129 from a point remote from the gun. The importance of these features may not be realized until it is recalled that in previously existing weapons of similar function it is necessary to work one or more cartridges through the mechanism manually to accomplish recharging or even recocking of the firing mechanism.

By this invention a fully automatic cannon capable of handling cartridges of maximum power has been produced and the weight and space requirements have been considerably reduced as compared with previously existing weapons of similar caliber and function.

I claim:

1. In a firearm having a breechblock automatically opened in response to recoil and held open during counterrecoil, the combination therewith of a housing attached to a non-recoiling portion of said firearm, a cartridge tray, a pair of bell cranks pivoted on said housing, means pivoting corresponding arms of said bell cranks to said cartridge tray for supporting the same for movement from an elevated position to a depressed position, said cartridge tray when elevated being positioned to receive a cartridge and when in its depressed position being axially aligned with the bore of the barrel, latching means on said housing releasably locking said cartridge tray, when empty, in the elevated position and adapted to be engaged by insertion of a cartridge into said tray for shifting said latching means out of locking engagement with said cartridge tray thus freeing the same for movement to the depressed position, a link connecting the remaining corresponding arms of said bell cranks, a cam forming the terminal of said link, spring means connected to said housing and to one of said corresponding arms of said bell cranks for biasing said cartridge tray to the depressed position, a slide slidably mounted upon said housing and pivotally attached to one of said bell cranks, crank means operated in response to closing of the breechblock to engage said slide and shift the same and thereby said cartridge tray to the elevated position against the action of said spring means, a rammer guide attached to said housing, a hollow rammer sleeve slidably mounted in said rammer guide, a rammer spring in said rammer guide engaging said rammer sleeve for impelling the same towards the barrel, a rammer head pivotally attached to said rammer sleeve for tilting movement between a first and a second position, said rammer head when in the first position being above the breechblock and in engagement with the breech of the barrel for movement by the same to a retracted position upon recoil of the barrel with sufficient velocity to overrun the distance traversed by said barrel in recoil and when in the second position being adapted to be moved by the rammer spring for forcing a cartridge from the cartridge tray into the barrel, means on said cartridge tray for moving said rammer head from the first to the second position when said cartridge tray is moved into the depressed position causing said rammer head to become aligned with the cartridge on the cartridge tray, said rammer head being adapted to be returned to the first position by the breechblock when moved to a closing position, a latch pivoted to the housing and adapted to project into the path of said rammer sleeve to hold the same in the retracted position, and cam means pivotally attached to said latch and adapted to be actuated by said cam on the link when said tray moves into its depressed position to move said latch out of the path of said rammer sleeve whereby said rammer head will force a cartridge from the cartridge tray into the barrel chamber.

2. In a firearm having a cradle, a barrel supported on the cradle for reciprocating movements in recoil and counterrecoil, and a breechblock opened by and in response to recoil and held open during counterrecoil, the combination therewith of a housing attached to the cradle structure, a cartridge tray, a pair of bell cranks pivoted on said housing, means pivoting corresponding arms of said bell cranks to said cartridge tray for supporting the same for movement from an elevated to a depressed position, said cartridge tray when elevated being in position to receive a cartridge and when depressed being axially aligned with the bore of the barrel, a link connecting the remaining corresponding arms of said bell cranks, a cam forming the terminal of said link, spring means connected to said housing and to one of said corresponding arms of said bell cranks for biasing said cartridge tray to the depressed position, a slide slidably mounted upon said housing and pivotally attached to one of said bell cranks, crank means operated by the breechblock actuating means and adapted to engage said slide for shifting the same and thereby said cartridge tray to the elevated position against the action of said spring means, a rammer guide attached to said housing, a hollow rammer sleeve slidably mounted in said rammer guide, a rammer spring in said rammer guide engaging said rammer sleeve for impelling the same towards the barrel, a rammer head pivotally attached to said rammer sleeve for movement between a first and a second position, said rammer head when in the first position being above the breechblock and in engagement with the breech of the barrel for movement by the same to a retracted position upon recoil of the barrel, with sufficient velocity to overrun the distance traversed by said barrel in recoil and when in the second position being adapted to be moved by the rammer spring for forcing a cartridge from the cartridge tray into the barrel, means on said cartridge tray for moving said rammer head from the first to the second position when said cartridge tray is moved into the depressed position thus causing said rammer head to become aligned with the cartridge on the cartridge tray, said rammer head being adapted to be returned to the first position by the breechblock when moved to a closing position, a latch pivoted to the housing and adapted to project into the path of said rammer sleeve to hold the same in the retracted position, and cam means pivotally attached to said latch and adapted to be actuated by said cam on the link when said tray moves into depressed position to move said latch out of the path of said rammer sleeve whereby said rammer head will force a cartridge from the cartridge tray into the barrel chamber.

3. In a firearm having a cradle, a barrel supported on the cradle for reciprocating movements in recoil and counterrecoil, and having a breechblock automatically opened by and in response to recoil, the combination therewith of a housing attached to the cradle, a cartridge tray, pivot attached to the cradle, a cartridge tray, pivot means on said housing and attached to said cartridge tray for supporting the same for movement from an elevated to a depressed position, said cartridge tray when elevated being positioned to receive a cartridge and when depressed being axially aligned with the bore of the barrel, a link means connected to said pivot means, a cam on said link means, spring means connected to said housing and said pivot means for biasing said cartridge tray to the depressed position, a slide slidably mounted upon said housing and pivotally attached to said pivot means, crank means operated in response to closing of the breechblock and adapted to engage said slide to shift the same and thereby said cartridge tray to the elevated position against the action of said spring means, a rammer guide attached to said housing, a hollow rammer sleeve slidably mounted in said rammer guide, a rammer spring in said rammer guide engaging said rammer sleeve for impelling the same towards the barrel, a rammer head pivotally attached to said rammer sleeve for movement between a first and a second position, said rammer head when in the first position being above the breechblock and in engagement with the breech of the barrel for movement by the same to a retracted position upon recoil of the barrel, with sufficient velocity to overrun the distance traversed by said barrel in recoil and when in the second position being adapted to ram a cartridge from the cartridge tray into the barrel under the action of said rammer spring, means on said cartridge tray for moving said rammer head from the first to the second position when said cartridge tray is moved into the depressed position causing said rammer head to become aligned with the cartridge on the cartridge tray, said rammer head being adapted to be returned to the first position by the breechblock when moved to a closing position, a latch pivoted to the housing and adapted to project into the path of said rammer sleeve to hold the same in the retracted position, and cam means pivotally attached to said latch and adapted to be actuated by said cam on the link means when said tray moves into depressed position to move said latch out of the path of said rammer sleeve whereby said rammer head will force a cartridge from the cartridge tray into the barrel chamber.

4. In a firearm having a cradle, a barrel supported on the cradle for recoil and counterrecoil, the barrel having a breechblock automatically opened by and in response to movement of said barrel in recoil, the combination therewith of a housing attached to the cradle, a cartridge tray, supporting means on said housing for guiding said cartridge tray from an elevated to a depressed position, said cartridge tray when elevated being positioned to receive a cartridge and when depressed being axially aligned with the bore of the barrel, first cam means connected to said supporting means, means resiliently urging said cartridge tray to the depressed position, a slide mounted upon said housing and attached to said supporting means, means operated by the breechblock actuating means and adapted to engage said slide for shifting the same and thereby said cartridge tray to the elevated position against the action of said resilient means, a rammer guide attached to said housing, a rammer slidably mounted in said rammer guide, a rammer spring in said rammer guide engaging said rammer for impelling the same towards the barrel, a rammer head movably attached to said rammer for movement between a first and a second position, said rammer head when in the first position being above the breechblock and in engagement with the breech of the barrel for movement by the same to a retracted position upon recoil of the barrel, with sufficient velocity to overrun the distance traversed by said barrel in recoil and when in the second position being located to ram a cartridge from the cartridge tray into the barrel under the thrust of said rammer spring, means on said cartridge tray for moving said rammer head from the first to the second position when said cartridge tray is moved into the depressed position thereby moving said rammer head into alignment with a cartridge on the tray, said rammer head being returned to the first position by the breechblock when the breechblock is moved to closed position, a latch pivoted to the housing and adapted to project into the path of said rammer to hold the same in retracted position, and second cam means connected with said latch and adapted to be actuated by said first cam means when said tray moves into depressed position to move said latch out of the path of said rammer whereby said rammer head will force a cartridge from the cartridge tray into the barrel chamber.

5. In a firearm having a non-recoiling structure and a barrel supported on the non-recoiling structure for reciprocating movements of recoil and counterrecoil, the combination therewith of a housing attached to the non-recoiling structure, a cartridge tray, a pair of bell cranks pivoted on said housing, means pivoting corresponding arms of said bell cranks to said cartridge tray for supporting the same for movement from an elevated to a depressed position, said cartridge tray when elevated being positioned to receive a cartridge and when in the depressed position being axially aligned with the bore of the barrel, a link connecting the remaining corresponding arms of said bell cranks, a cam forming the terminal of said link, spring means connected to said housing and to one of said corresponding arms of said bell cranks for biasing said cartridge tray to the depressed position, a rammer guide attached to said housing, a hollow rammer sleeve slidably mounted in said rammer guide, a rammer spring in said rammer guide engaging said rammer sleeve for impelling the same towards the barrel, a rammer head pivotally attached to said rammer sleeve for movement between a first and a second position, said rammer head when in the first position being in engagement with the barrel for movement thereby to a retracted position upon recoil of the barrel, with sufficient velocity to overrun the distance traversed by said barrel in recoil and when in the second position being adapted to be moved in the opposite direction by the rammer spring for forcing a cartridge from the cartridge tray into the barrel, means on said cartridge tray for moving said rammer head from the first to the second position when said cartridge tray is moved into the depressed position causing said rammer head to become aligned with the cartridge on the cartridge tray, a latch pivoted to the housing and adapted to project into the path of said rammer sleeve to hold the same in its retracted position, cam means pivotally attached to said latch and adapted to be actuated by said cam on the link when said tray is in the depressed position to move said latch out of the path of said rammer sleeve whereby said rammer spring will move said sleeve and head to ram the cartridge from the cartridge tray into the barrel chamber, and means for returning said rammer head to the first position upon entrance of the cartridge into the barrel chamber.

6. In a firearm having a cradle and a barrel supported on the cradle for recoil and counterrecoil, the combination therewith, of a housing fixedly carried by the cradle, first and second bellcranks pivoted on said housing on parallel longitudinally spaced axes, a link connecting said bellcranks for synchronous pivotal movement, a cartridge tray pivoted to corresponding ends of each said bellcranks and movable therewith from a first, elevated loading position to a second depressed ramming position in alignment with the bore of barrel, spring means urging said tray into depressed position, a rammer, means supported by said cradle independently of said tray for mounting said rammer for longitudinal movement to a retracted position by and in response to recoil of the barrel, spring means urging said rammer forwardly when retracted, latch means operable to hold said rammer in retracted position, and cam means carried by said link and operable to engage and release said latch means as said tray moves into depressed position whereby said rammer means is released to ram a cartridge on said tray into the barrel chamber.

7. In a rapid-fire gun having a barrel mounted in a cradle for recoil and counterrecoil, the barrel having a breechblock and means automatically moving the breechblock to open position in response to recoil of the barrel, an upright wall fixedly carried by the cradle at one side of the barrel, a pair of levers pivoted on said wall on spaced parallel axes, a link connecting said levers for synchronous pivotal movement, a loading tray pivoted to a corresponding arm of each lever for movement in response to rotation of said levers, from a first position clear of the recoil path of the barrel, to a second position in alignment with the bore of the barrel, spring means urging said tray into second position, a slide reciprocable on said wall and pivotally connected with one said lever, and a crank connected with said breechblock moving means and engaging said slide to hold said tray in first position when the breechblock is closed, said crank being moved to release said slide when the breechblock is opened.

8. A gun as recited in claim 7, a rail carried by said cradle and movable into engagement with said slide during recoil as said crank moves out of engagement with said slide, to thereby hold said tray in first position until the barrel has substantially completed movement in counterrecoil.

9. In a loading mechanism for a gun having a reciprocable breechblock and mechanism operable to open the breechblock in response to movement of said gun in recoil, a cartridge tray, means supporting said tray for translation between a first position out of the path of the barrel during recoil and a second position wherein said tray is in alignment with the barrel, means attached to said supporting means and yieldingly urging said tray into second position, cartridge ramming means, latch means releasably holding said ramming means in first position, means actuated by said supporting means and releasing said latch means as said supporting means moves said tray into second position, to thereby initiate operation of said ramming means to shift a cartridge from the tray into the barrel, and means engaging and actuating said supporting means to move said tray into first position by and in response to closure of said breech mechanism and against the urge of said yielding means.

10. In a rapid-fire gun having a barrel reciprocable in recoil and counterrecoil and a breechblock automatically opened in response to recoil and closed in response to ramming of a cartridge into the barrel, a cartridge tray, parallelogram lever supporting means mounting said tray for movement between a first position out of the recoil path of the barrel and a second position into alignment with the barrel, spring means urging said supporting means to move said tray into second position, pivoted spring-urged locking means normally engaging and holding said tray in first position, said locking means being engaged and moved by a cartridge when loaded onto said tray to release said tray, cartridge ramming means operable to ram a cartridge from said tray in second position into the barrel, means operated by movement of said supporting means as said tray moves into second position to initiate ramming movement of said ramming means, and means positively returning said tray to first position by and in response to closure of the breechblock.

11. In a loading mechanism for a rapid-fire gun, a side plate, a cartridge loading tray comprising a substantially cylindrical shell having one side removed to form a side-loading opening, a pair of levers having their one ends pivoted to said tray on parallel axes transverse to the axis of said cylindrical shell and their other ends pivoted to said plate, said levers mounting said tray for movement from a first retracted position to a second loading position in substantial alignment with the gun, and an abutment on the rearwardmost one of said levers and projecting into said tray when said tray is in first position immediately in advance of the rim of a cartridge therein to prevent forward motion of said cartridge relatively to said tray, said abutment being moved out of contact with the cartridge rim as the levers are pivoted to move said tray to second position.

WILLIAM SUMMERBELL.

REFERENCES CITED

The following references are of record in the file of this patent:

UNITED STATES PATENTS

| Number | Name | Date |
|---|---|---|
| 593,228 | Maxim | Nov. 9, 1897 |
| 644,969 | Dawson et al. | Mar. 6, 1900 |
| 738,666 | Dawson et al. | Sept. 8, 1903 |
| 1,332,763 | Schneider | Mar. 2, 1920 |
| 1,750,724 | Methlin | Mar. 18, 1930 |
| 2,056,975 | Michal, Jr. | Oct. 13, 1936 |
| 2,122,423 | Joyce | July 5, 1938 |
| 2,139,691 | Michal, Jr. | Dec. 13, 1938 |

FOREIGN PATENTS

| Number | Country | Date |
|---|---|---|
| 13,152 | Norway | Sept. 3, 1901 |